J. D. GARLICK.
TIRE FOR MOTOR DRIVEN VEHICLES.
APPLICATION FILED SEPT. 7, 1915.
1,161,470.
Patented Nov. 23, 1915.
2 SHEETS—SHEET 2.
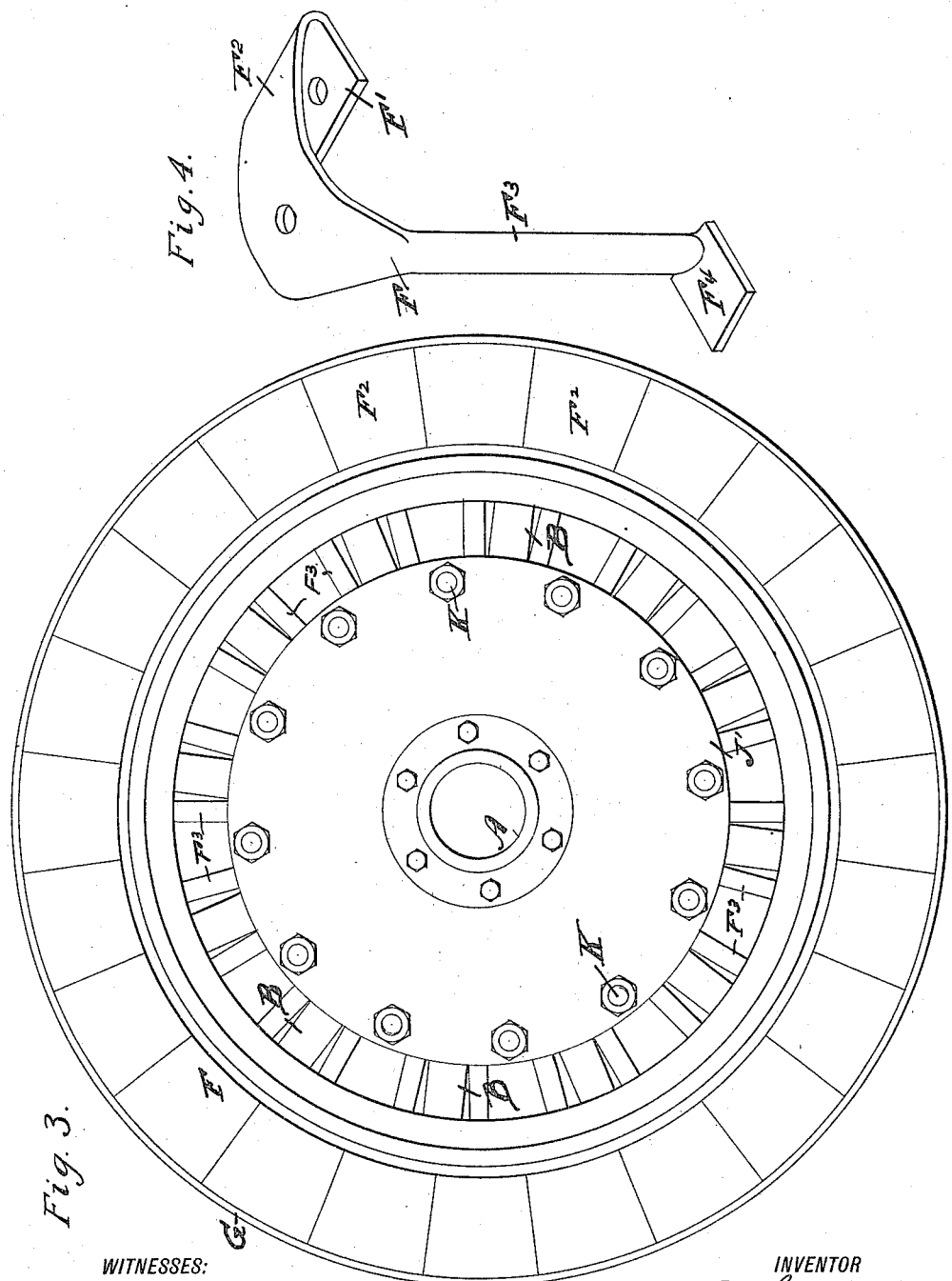

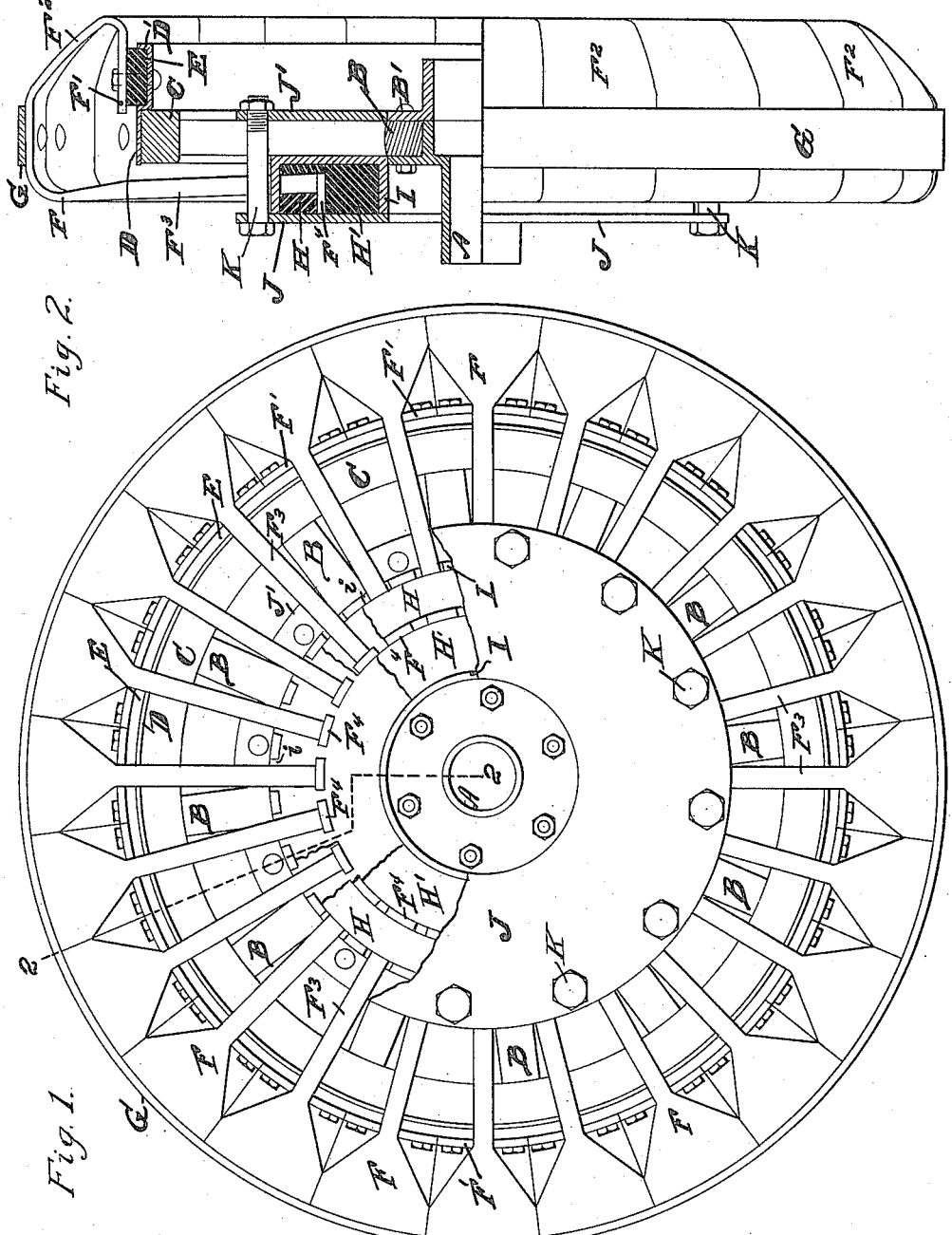

UNITED STATES PATENT OFFICE.

JAMES D. GARLICK, OF PORT HURON, MICHIGAN, ASSIGNOR OF ONE-FOURTH TO WALTER S. BRYCE, OF PORT HURON, MICHIGAN.

TIRE FOR MOTOR-DRIVEN VEHICLES.

1,161,470.  Specification of Letters Patent.  Patented Nov. 23, 1915.

Application filed September 7, 1915. Serial No. 49,413.

*To all whom it may concern:*

Be it known that I, JAMES D. GARLICK, citizen of the United States, residing at Port Huron, county of St. Clair, State of Michigan, have invented a certain new and useful Improvement in Tires for Motor-Driven Vehicles, and declare the following to be a full, clear, and exact description of the same, such as will enable others skilled in the art to which it pertains to make and use the same, reference being had to the accompanying drawings, which form a part of this specification.

My invention relates to an improvement in tires for motor driven vehicles, shown in the accompanying drawings and more particularly pointed out in the following specification and claims.

While my invention may be used for all four wheels of a vehicle, it is especially designed for emergency purposes to take the place of a punctured or blown-out tire.

One of the objects of my invention is to provide a tire having a metallic tread, mounted upon a resilient supporting means, in turn carried by the usual type of wooden wheel of a motor driven vehicle.

Another object is to support the metallic tread by resilient auxiliary spokes, each having a foot piece lodged between annular rubber or other elastic rings encircling the hub portion, the purpose of the latter being to augment the resiliency of the tire.

Other advantages and improvements will hereafter appear.

In the drawings:—Figure 1, is a side elevation of a wheel with the tire in place, a portion being broken away to more clearly disclose the construction. Fig. 2, is an elevation at right angles to Fig. 1, showing one-half in cross-section taken on line 2—2 of Fig. 1. Fig. 3, is a side elevation opposite to that shown in Fig. 1. Fig. 4, is a perspective view of one of the auxiliary resilient spokes.

Referring now to the letters of reference placed upon the drawings:—A, denotes the hub of a wheel. B, its wooden spokes secured to the hub by bolts B'.

C, is the wood felly, secured to which is a metallic collar D, having an offset projecting channel portion D', in which is lodged a rubber or other elastic ring, E.

F, denotes a plurality of auxiliary resilient spokes, having an inwardly bent relatively wide portion F', resting upon the ring E, bolted through the latter to the channel member D'. The edges of the broad portion of the spokes are in abutting relation, to form a continuous rim adapted to support a metallic tread G, bolted thereto:—the portion $F^2$, of the spokes being directed outwardly and at an angle to the portion F', to provide for resilient action:—adjacent to the tread, and extending inwardly toward the hub, the spokes are given a circular or semi-circular form in cross-section,—as indicated at $F^3$ in Fig. 4,—terminating in a foot piece $F^4$, which is designed to project between a pair of concentric rubber or other elastic rings, H and H', lodged in an annular channel member I, concentric to the hub.

J and J', are annular disks concentric to the hub:—the disk J, overlapping the open face of the annular channel member I, while the disk J' lies adjacent to the face of the wood spokes B. The disks J and J', are connected together by bolts K, projecting through slots $i$, cut in the outer rim of the channel member I, as indicated in Fig. 1.

Having indicated the several parts by reference letters the construction and operation of the device will be readily understood.

It will be apparent that the foot piece $F^4$, of the respective auxiliary spokes carrying the portion of the tire tread at the time in contact with the ground, will have a tendency to compress the ring H', while the foot pieces of the spokes carrying the portion of the tire tread at that period out of contact with the ground will through co-action, compress the concentric rubber ring H. Thus the action of the rings H and H', together with the ring E, will give added resiliency to the tire and serve to deaden the noise incident to the movement of the resilient spokes.

By constructing the resilient spokes F, with a relatively broad tread portion in abutting relation, the spring action is increased while the entry of dust or dirt between the spokes is prevented.

Having thus described my invention what I claim is:—

1. In combination with a vehicle wheel, a device of the character described comprising an annular collar secured to the wheel felly, a resilient ring supported by the annular collar, a plurality of resilient spokes having one end relatively broad and flat and bent inwardly to overlap the resilient ring, bolts for securing the flattened end of the spokes to the resilient ring and annular collar, said spokes overlapping the felly of the wheel but spaced therefrom and extending thence inwardly toward the hub, the inwardly extending portion being relatively narrow and provided at its end with an outstanding foot-portion, a pair of concentrically arranged resilient rings adapted to receive between them the foot-portion of the respective resilient spokes, and an annular channel member concentric with the wheel hub to receive and support the rings.

2. In combination with a vehicle wheel, a device of the character described, comprising an annular collar secured to the wheel felly, a resilient ring supported by the annular collar, a plurality of resilient spokes having one end relatively broad and flat and bent inwardly to overlap the resilient ring, bolts for securing the flattened end of the spokes to the resilient ring and annular collar, said spokes overlapping the felly of the wheel but spaced therefrom and extending thence inwardly toward the hub, the inwardly extending portion being relatively narrow and provided at its end with an out-standing foot-portion, a pair of concentrically arranged resilient rings adapted to receive between them the foot-portion of the respective resilient spokes, an annular channel member concentric with the wheel hub to receive and support the rings, and a tire secured to the flattened portion of the resilient spokes.

3. In combination with a vehicle wheel, a device of the character described comprising an annular collar secured to the wheel felly, a resilient ring supported by the annular collar, a plurality of resilient spokes having one end relatively broad and flat and bent inwardly to overlap the resilient ring, bolts for securing the flattened end of the spokes to the resilient ring and annular collar, said spokes overlapping the felly of the wheel but spaced therefrom and extending thence inwardly toward the hub, the inwardly extending portion being relatively narrow and provided at its end with an out-standing foot-portion, a pair of concentrically arranged resilient rings adapted to receive between them the foot-portion of the respective resilient spokes, an annular channel member concentric with the wheel hub to receive and support the rings, annular disks adapted to respectively overlap the channel member and the spokes of the wheel, a plurality of bolts engaging the respective disks to secure them in position, and a tire secured to the flattened portion of the resilient spokes.

In testimony whereof, I sign this specification in the presence of two witnesses.

JAMES D. GARLICK.

Witnesses:
GEORGE H. GORDON,
FRANK MUSMER.

Copies of this patent may be obtained for five cents each, by addressing the "Commissioner of Patents Washington, D. C."